(12) United States Patent
Kim et al.

(10) Patent No.: US 8,053,119 B2
(45) Date of Patent: Nov. 8, 2011

(54) REFORMER AND FUEL CELL SYSTEM HAVING THE SAME

(75) Inventors: Ju-Yong Kim, Suwon-si (KR); Hyun-Jeong Lim, Suwon-si (KR); Ji-Seong Han, Suwon-si (KR); Zin Park, Suwon-si (KR); Eun-Suk Cho, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1248 days.

(21) Appl. No.: 11/140,357

(22) Filed: May 26, 2005

(65) Prior Publication Data
US 2005/0271907 A1    Dec. 8, 2005

(30) Foreign Application Priority Data

Jun. 7, 2004 (KR) .................... 10-2004-0041329

(51) Int. Cl.
*H01M 8/00* (2006.01)
(52) U.S. Cl. ............... 429/423; 48/61; 48/197; 165/103
(58) Field of Classification Search .................... 429/12, 429/423; 48/61, 197; 165/66, 103, 140–156
See application file for complete search history.

(56) References Cited

U.S. PATENT DOCUMENTS

| 6,348,278 B1 | 2/2002 | LaPierre et al. |
| 7,066,973 B1 | 6/2006 | Bentley et al. |
| 2002/0088740 A1* | 7/2002 | Krause et al. .................... 208/46 |
| 2002/0172630 A1* | 11/2002 | Ahmed et al. ................ 422/190 |
| 2003/0054213 A1 | 3/2003 | Ishikawa |
| 2003/0161768 A1 | 8/2003 | Kawamoto et al. |
| 2004/0038095 A1 | 2/2004 | Kushibiki et al. |
| 2004/0068933 A1 | 4/2004 | Nakamura et al. |

(Continued)

FOREIGN PATENT DOCUMENTS

CN          1341076 A          3/2002

(Continued)

OTHER PUBLICATIONS

European Search Report dated Oct. 18, 2005, for corresponding European application 05105819.6.

(Continued)

*Primary Examiner* — Robert Hodge
*Assistant Examiner* — Stephen Yanchuk
(74) *Attorney, Agent, or Firm* — Christie, Parker & Hale, LLP

(57) ABSTRACT

There is provided a fuel cell system comprising: a stack for generating electric energy through a reaction between hydrogen and oxygen; a reformer for generating hydrogen from fuel through a catalytic reaction of the fuel using thermal energy and for supplying the generated hydrogen to the stack; a fuel supply unit for supplying the fuel to the reformer; and an oxygen supply unit for supplying oxygen to the reformer and the stack. The reformer comprises: a tubular reactor body; a heat source section which is formed in the inner space of the tubular reactor body and which generates thermal energy in a predetermined temperature range through an oxidation reaction of fuel; a reforming reaction section which is formed successive to the heat source section and which generates hydrogen from the fuel through a reforming reaction using the thermal energy; and a heat delivery unit which is provided in contact with the tubular reactor body and which delivers the thermal energy to the fuel supplied to the reforming reaction section.

10 Claims, 5 Drawing Sheets

U.S. PATENT DOCUMENTS

| | | |
|---|---|---|
| 2004/0126288 A1 | 7/2004 | Fuju et al. |
| 2004/0133202 A1 | 7/2004 | Suzuki et al. |
| 2005/0189094 A1 | 9/2005 | Van Decker et al. |
| 2005/0241232 A1* | 11/2005 | Reinke et al. ............ 48/76 |

FOREIGN PATENT DOCUMENTS

| | | |
|---|---|---|
| EP | 0 199 878 | 11/1986 |
| EP | 1 024 111 A1 | 8/2000 |
| EP | 1 167 282 A1 | 1/2002 |
| JP | 61-247601 | 11/1986 |
| JP | 11-021103 | 1/1999 |
| JP | 11-510311 | 9/1999 |
| JP | 2001-135336 | 5/2001 |
| JP | 2002-293502 A | 10/2002 |
| JP | 2003-089505 | 3/2003 |
| JP | 2003-212507 A | 7/2003 |
| JP | 2003-277019 A | 10/2003 |
| JP | 2004-26596 A | 1/2004 |
| JP | 2004-139846 A | 5/2004 |
| JP | 2004-515444 A | 5/2004 |
| JP | 2004-535350 A | 11/2004 |
| JP | 2004-536006 | 12/2004 |
| JP | 2005-500966 | 1/2005 |
| WO | WO 02/34383 A1 | 5/2002 |

OTHER PUBLICATIONS

U.S. Office action dated Feb. 20, 2009, for related U.S. Appl. No. 11/154,058.

U.S. Office action dated Dec. 16, 2009, for related U.S. Appl. No. 11/154,058.

U.S. Office action dated Jun. 2, 2010, for related U.S. Appl. No. 11/154,058.

U.S. Office action dated Nov. 2, 2010, for cross reference U.S. Appl. No. 11/154,058.

* cited by examiner

REFORMER AND FUEL CELL SYSTEM HAVING THE SAME

CROSS-REFERENCE TO RELATED APPLICATION

This application claims priority to and the benefit of Korean Patent Application No. 10-2004-0041329 filed on Jun. 7, 2004 in the Korean Intellectual Property Office, the entire content of which is incorporated herein by reference.

FIELD OF THE INVENTION

The present invention relates to a fuel cell system and more particularly to a fuel cell system having an improved reformer.

BACKGROUND OF THE INVENTION

As is well known, a fuel cell is a system for generating electric energy through an electrochemical reaction between oxygen and hydrogen contained in hydrocarbon materials such as methanol, ethanol, or natural gas.

Recently developed polymer electrolyte membrane fuel cells (hereinafter, referred to as PEMFCs) have excellent output characteristics, low operating temperatures, and fast starting and response characteristics. PEMFCs may be used for a wide range of applications including mobile power sources for vehicles, distributed power sources for homes or buildings, and small-sized power sources for electronic apparatuses.

A fuel cell system employing the PEMFC scheme basically includes a stack, a reformer, a fuel tank, and a fuel pump. The stack constitutes an electricity generation set having a plurality of unit cells and the fuel pump supplies fuel from the fuel tank to the reformer. There, the reformer reforms the fuel to generate hydrogen that is supplied to the stack.

The reformer generates hydrogen from the fuel through a catalytic chemical reaction using thermal energy, and includes a heat source section where thermal energy is generated, and a reforming reaction section where thermal energy is absorbed to generate hydrogen from the fuel.

However, in the reformer of a conventional fuel cell system, since the heat source section and the reforming reaction section are typically separated from one another and connected to each other through pipes, there is no direct heat exchange between the sections. Accordingly, such a system generally requires a preheating time for the reforming reaction section, and further, because the heat delivery path is elongated, the thermal efficiency is poor. In addition, since the respective sections are separated, it is difficult to make the system compact.

Furthermore, for a conventional fuel cell system, since the fuel supplied to the reformer generally must be preheated with an additional preheating device, much energy is spent in preheating the fuel, thereby deteriorating the performance and thermal efficiency of the entire system.

SUMMARY OF THE INVENTION

In one embodiment of the present invention, a reformer is provided which can enhance reaction efficiency and thermal efficiency with a simple structure. In another embodiment, a fuel cell system is provided having the reformer.

According to one embodiment of the present invention, a reformer of a fuel cell system is provided comprising: a tubular reactor body; a heat source section which is formed in a first portion of the inner space of the tubular reactor body and which generates thermal energy in a predetermined temperature range through an oxidation reaction of fuel; a reforming reaction section which is formed in a second portion of the inner space of the tubular reactor body downstream from the heat source section and which generates hydrogen from the fuel through a reforming reaction using the thermal energy; and a heat delivery unit which is provided in contact with the tubular reactor body and which delivers the thermal energy to the fuel supplied to the reforming reaction section.

A flow inlet may be formed at one end of the tubular reactor body with a flow outlet at the other end.

The reformer may further comprise a barrier which is disposed in the inner space of the tubular reactor body and which partitions the heat source section and the reforming reaction section. The barrier may be made of mesh or some other perforated material.

The heat source section may be formed in the inner space between the flow inlet and the barrier and the reforming reaction section may be formed in the inner space between the barrier and the flow outlet.

A catalyst layer comprising, for example, a pellet-shaped oxidation catalyst may be filled in the inner space between the flow inlet and the barrier to form the heat source section, and a pellet-shaped reforming catalyst layer for promoting the reforming reaction may be filled in the inner space between the barrier and the flow outlet to form the reforming reaction section.

The heat delivery unit may include a tubular pass member which is wound around the outer circumferential surface of the tubular reactor body in a number of windings to form a coil shape and which is connected to the flow inlet, and a switch valve provided in the tubular pass member.

The pass member may have a structure such that the number of windings around the outer circumferential surface of the tubular reactor body corresponding to the heat source section is greater than the number of windings around the outer circumferential surface of the tubular reactor body corresponding to the reforming reaction section.

The tubular reactor body may be made of a metal having good thermal conductivity, and suitable metals include those selected from the group consisting of stainless steel, aluminum, copper, and iron.

According to another aspect of the present invention, a fuel cell system is provided comprising: a stack for generating electric energy through a reaction between hydrogen and oxygen; a reformer for generating hydrogen from fuel through a catalytic reaction of the fuel using thermal energy and for supplying the hydrogen to the stack; a fuel supply unit for supplying the fuel to the reformer; and an oxygen supply unit for supplying oxygen to the reformer and the stack, wherein the reformer has a structure with an oxidation catalyst layer and a reforming catalyst layer successively located inside a tubular reactor body, and a heat delivery unit for preheating the fuel using the thermal energy is provided on the outer circumferential surface of the tubular reactor body.

The fuel cell system may further comprise a barrier such as a mesh-shaped barrier which is disposed in the inner space of the tubular reactor body and which substantially partitions the heat source section and the reforming reaction section.

The oxidation catalyst layer and the reforming catalyst layer may each be formed as pellets.

The heat delivery unit may be formed as a tubular pass member which is wound around the outer circumferential surface of the tubular reactor body in a coil shape.

The heat delivery unit may further comprise a switch valve provided in the tubular pass member.

In one embodiment, the pass member has a structure such that the number of windings around the outer circumferential surface of the tubular reactor body corresponding to the oxidation catalyst layer is greater than the number of windings around the outer circumferential surface of the tubular reactor body corresponding to the reforming catalyst layer.

The fuel supply unit may comprise a first tank for storing the fuel, a second tank for storing water, and a fuel pump connected to the first and second tanks.

The first tank and the flow inlet of the tubular reactor body may be connected to each other through the first supply line and a switch valve may be provided in the first supply line.

The heat delivery unit may be formed as a tubular pass member which is wound around the outer circumferential surface of the tubular reactor body in a coil shape while contacting the outer circumferential surface of the tubular reactor body and which is connected to the flow inlet. The pass member may also be connected to the first and second tanks.

The pass member may be structured with the number of windings around the outer circumferential surface of the tubular reactor body corresponding to the oxidation catalyst layer greater than the number of windings around the outer circumferential surface of the tubular reactor body corresponding to the reforming catalyst layer.

The oxygen supply unit may include an air pump for producing air to the stack. The air pump and the flow inlet of the tubular reactor body may also be connected to each other through a second supply line.

The flow outlet of the tubular reactor body and the stack may be connected to each other through a third supply line.

The air pump and the stack may be connected to each other through a fourth supply line.

The stack may include a plurality of unit electricity generators, each having a membrane-electrode assembly with separators closely disposed on both surfaces of the membrane-electrode assembly. The stack includes an electricity generator set in which the plurality of electricity generators are sequentially stacked.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Hereinafter, exemplary embodiments of the present invention will be described in detail with reference to the attached drawings such that the embodiments can be put into practice by those skilled in the art. However, the present invention is not limited to the exemplary embodiments, but may be embodied in various forms.

Figure 1:
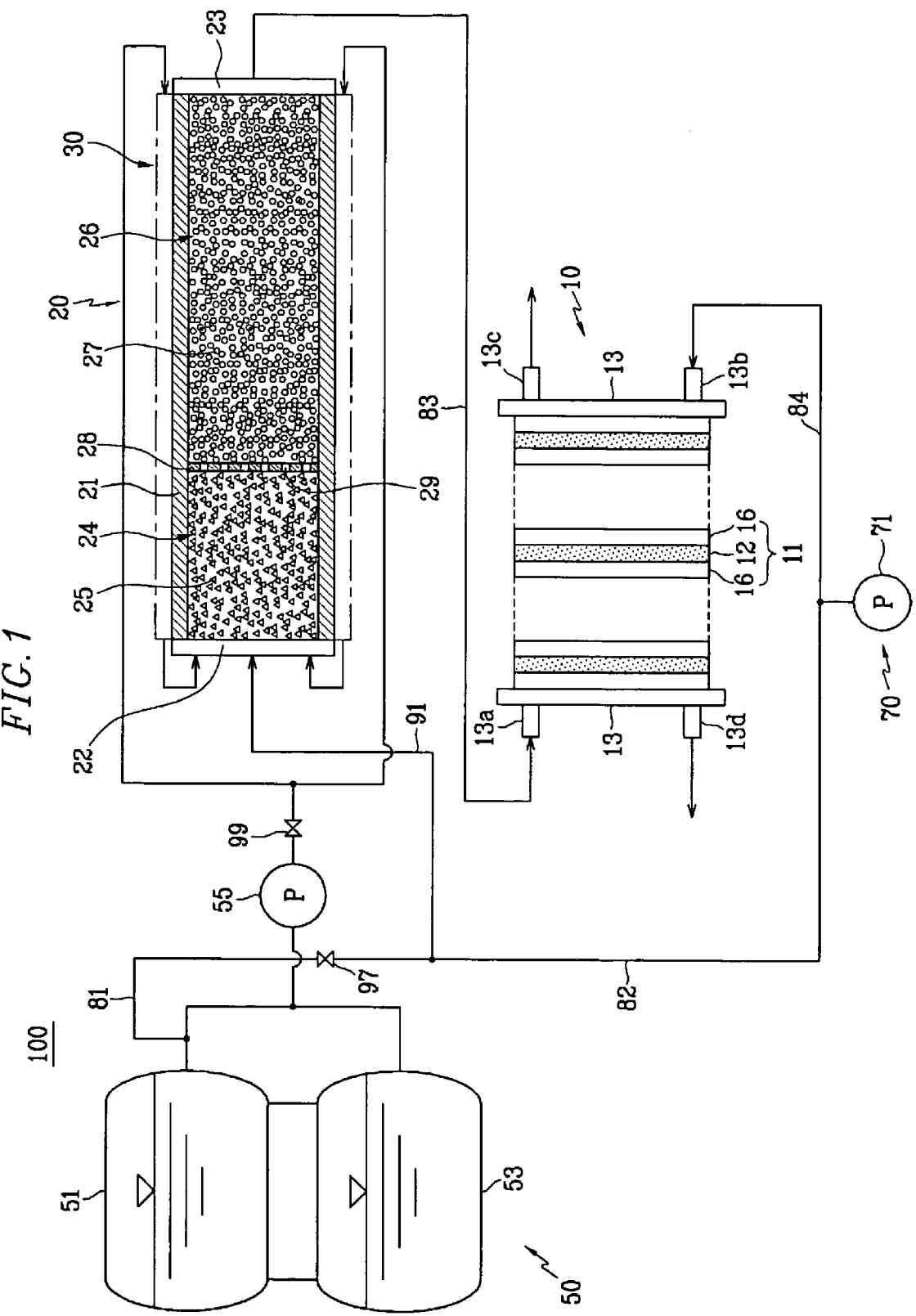
FIG. 1 is a block diagram schematically illustrating an entire construction of a fuel cell system according to an embodiment of the present invention.

FIG. 1 is a block diagram schematically illustrating an entire construction of a fuel cell system according to an embodiment of the present invention.

Referring to FIG. 1, the fuel cell system 100 has a polymer electrode membrane fuel cell (PEMFC) scheme, which includes a reformer to reform fuel to generate hydrogen and allows hydrogen and oxygen to electrochemically react with each other to generate electrical energy.

The fuel used for the fuel cell system 100 may include liquid or gas fuel containing hydrogen such as methanol, ethanol, and natural gas. However, the fuel described below in the present embodiments is a liquid fuel for convenient explanation, and the liquid fuel and water are defined as a fuel mixture.

The fuel cell system 100 may utilize pure oxygen stored in an additional storage device as oxygen for reacting with hydrogen or may utilize air containing oxygen. However, the latter is exemplified in the following description.

The fuel cell system 100 basically comprises a stack 10 for generating electric energy through a reaction between hydrogen and oxygen, a reformer 20 for reforming the fuel to generate hydrogen and supplying hydrogen to the stack 10, a fuel supply unit 50 for supplying the fuel to the reformer 20, and an oxygen supply unit 70 for supplying air to the stack 10 and the reformer 20.

The stack 10 is supplied with hydrogen from the reformer 20, and is supplied with air from the oxygen supply unit 70. Thus, the stack 10 serves as a fuel cell generating electric energy through the electrochemical reaction between hydrogen and oxygen. The structure of the stack 10 will be described in detail later with reference to FIG. 5.

In the present embodiment, the reformer 20 generates thermal energy through an oxidation reaction of the fuel and generates hydrogen through a reforming reaction of the fuel using the thermal energy. The structure of the reformer 20 will be described in detail later with reference to FIGS. 2 to 4.

The fuel supply unit 50 includes a first tank 51 for storing the fuel, a second tank 53 for storing water, and a fuel pump 55 which is connected to the first and second tanks 51 and 53 and which supplies the fuel stored in the first tank 51 and the water stored in the second tank 53 to the reformer 20.

The oxygen supply unit 70 includes an air pump 71 for producing air at a predetermined pressure and flow rate and supplying the air to the stack 10 and the reformer 20.

In the present embodiment, although the oxygen supply unit 70 is shown as supplying air to both the stack 10 and the reformer 20 with a single air pump 71, the present invention is not limited to such a configuration, and a pair of air pumps may be used, one feeding air to the stack 10 and the other feeding air to the reformer 20. Any one of a number of different air pumps may be used such as one with a fan structure.

Figure 2:
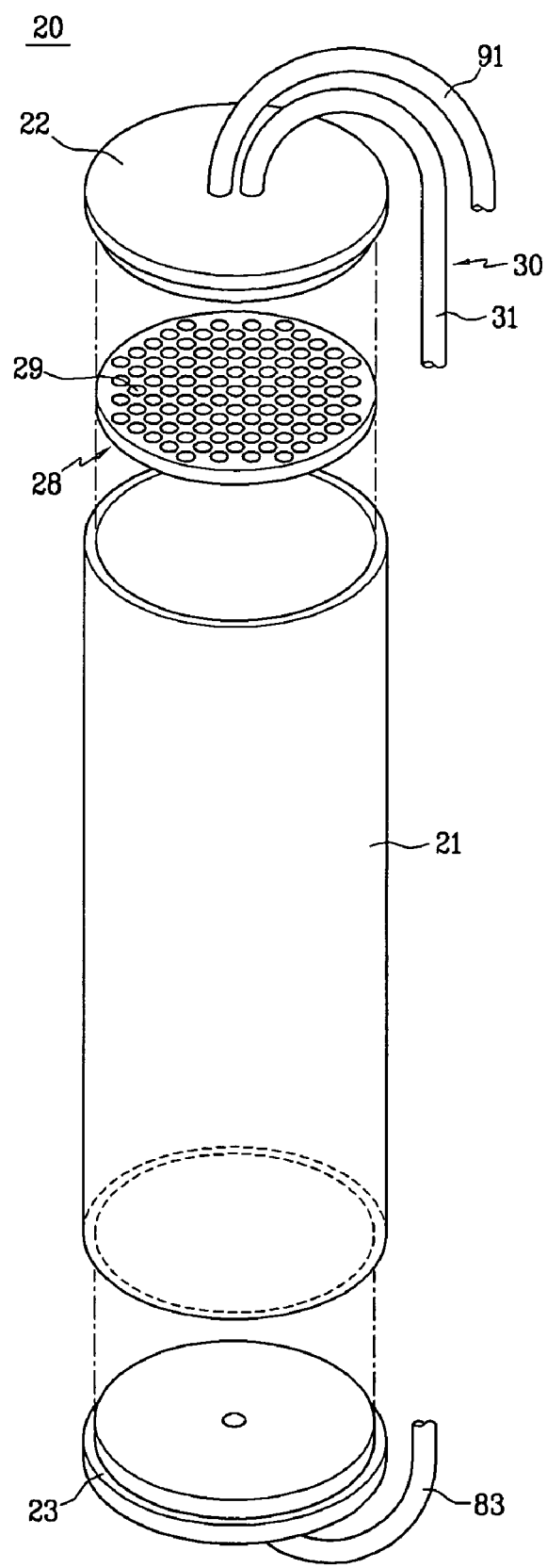
FIG. 2 is an exploded perspective view illustrating a reformer of a fuel cell system according to an embodiment of the present invention.
Figure 3:
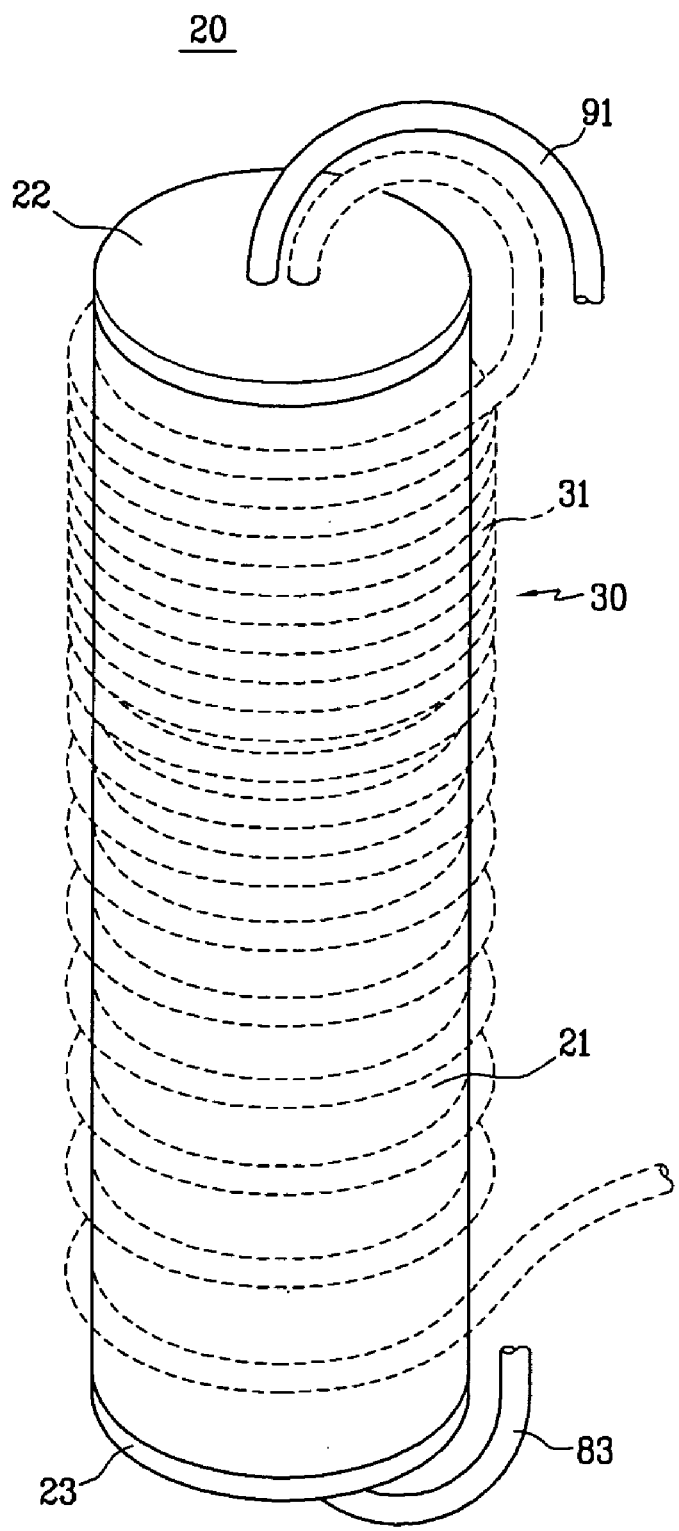
FIG. 3 is a coupled perspective view of the reformer shown in FIG. 2.
Figure 4:
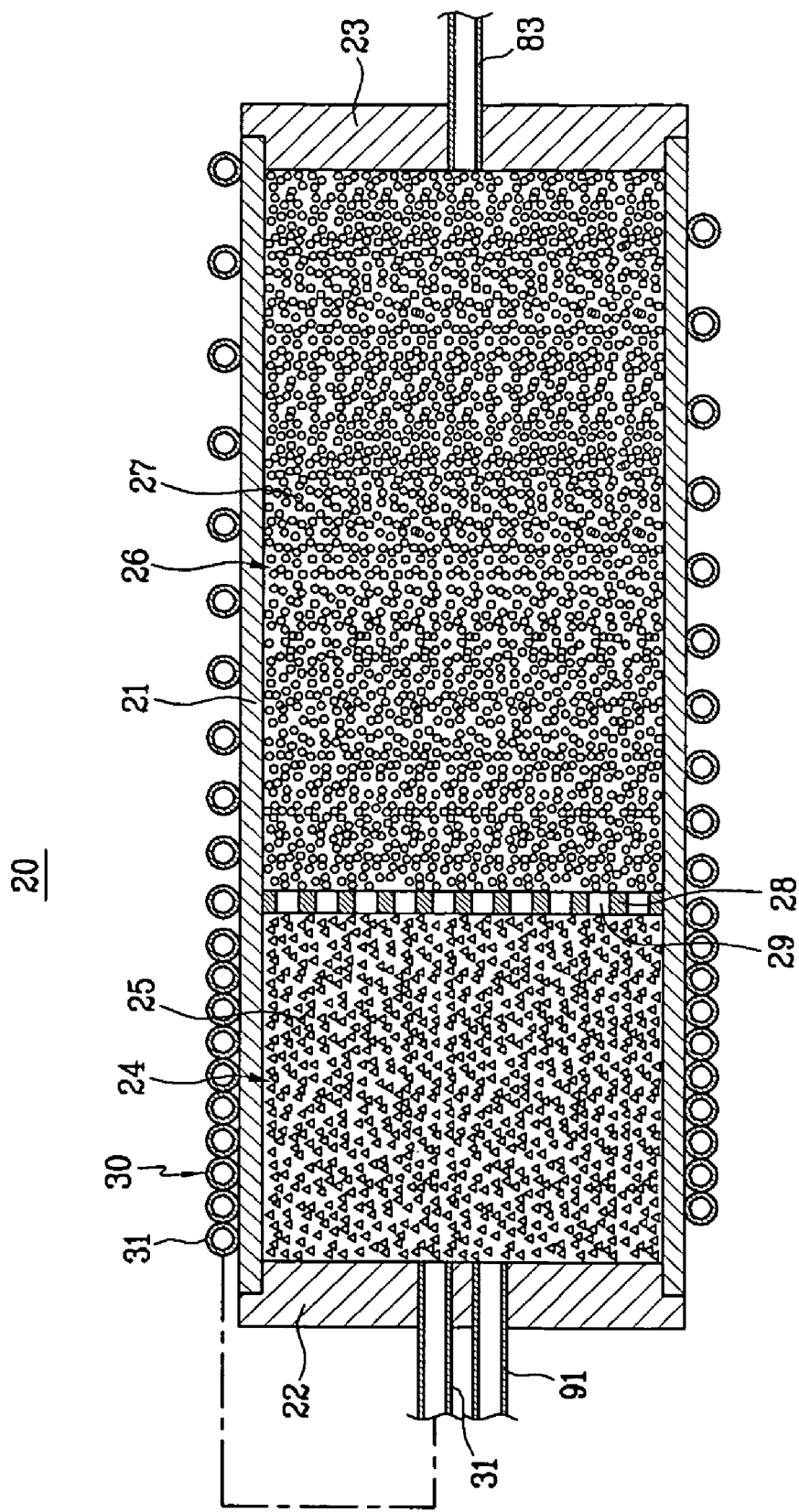
FIG. 4 is a cross-sectional view of the reformer shown in FIG. 3.

FIG. 2 is an exploded perspective view illustrating a reformer of a fuel cell system according to an embodiment of the present invention, FIG. 3 is a coupled perspective view of the reformer shown in FIG. 2, and FIG. 4 is a cross-sectional view of the reformer shown in FIG. 3.

Referring to FIGS. 1 to 4, the reformer 20 according to the present embodiment is formed in a tubular shape defining an inner space and including a heat source section 24 for generating thermal energy in a predetermined temperature range through the oxidation of fuel, and a reforming reaction section 26 for generating hydrogen from the fuel mixture through a steam reforming (SR) reaction of the fuel mixture using the thermal energy generated by the heat source section 24.

According to the present embodiment, the reformer 20 includes a tubular reactor body 21 having a cylindrical shape of which both ends are closed except for a flow inlet 22 at one end and a flow outlet 23 at the other end. The tubular reactor body 21 may be made of a material with good thermal conductivity such as stainless steel, aluminum, copper, iron, or the like.

The flow inlet 22 of the tubular reactor body 21 and the first tank 51 are connected to each other through a first supply line 81 and the flow inlet 22 and the air pump 71 are connected to each other through a second supply line 82. A first switch valve 97 for selectively opening and closing the first supply line 81 is provided in the first supply line 81. The first supply line 81 and the second supply line 82 merge into a single merged line 91 and are connected to the flow inlet 22 of the tubular reactor body 21 through the merged line 91. The flow inlet 22 of the tubular reactor body 21 and the first and second tanks 51 and 53 can be connected through a pass member 31 which is described in detail later.

In the reformer 20, the heat source section 24 is formed in the inner space of the tubular reactor body 21 and the reforming reaction section 26 is formed downstream from the heat source section 24 in the inner space. The heat source section 24 is formed in the vicinity of the flow inlet 22 in the inner space of the tubular reactor body 21. The reforming reaction section 26 is formed in the vicinity of the flow outlet 23 in the inner space of the tubular reactor body 21. A barrier, for example a mesh barrier 28 is provided inside the tubular reactor body 21 for partitioning the heat source section 24 and the reforming reaction section 26. For this embodiment, the barrier 28 has a circular disk shape with a plurality of pores 29. The barrier 28 serves to deliver the thermal energy and the reaction gas generated through the oxidation reaction of the fuel in the heat source section 24 to the reforming reaction section 26 through the pores 29, as well as to partition the heat source section 24 and the reforming reaction section 26 in the inner space of the tubular reactor body 21.

In the present embodiment, the heat source section 24 includes an oxidation catalyst layer 25 filled in the inner space of the tubular reactor body 21 between the barrier 28 and the flow inlet 22. The oxidation catalyst layer 25 serves to promote the oxidation reaction of the fuel and the air to generate the thermal energy in the predetermined temperature range, and has a structure such that a catalytic material such as platinum (Pt) or ruthenium (Ru) is contained on pellet-shaped carriers made of alumina ($Al_2O_3$), silica ($SiO_2$), or titania ($TiO_2$).

In the present embodiment, the reforming reaction section 26 includes a reforming catalyst layer 27 filled in the inner space of the tubular reactor body 21 between the barrier 28 and the flow outlet 23. The reforming catalyst layer 27 serves to promote the steam reforming reaction of the fuel mixture to generate hydrogen from the fuel mixture, and may include a catalytic material such as copper (Cu), nickel (Ni), or platinum (Pt) provided on pellet-shaped carriers made of materials such as alumina ($Al_2O_3$), silica ($SiO_2$), or titania ($TiO_2$).

The reformer 20 according to the present embodiment constitutes a heat delivery unit 30 for delivering the thermal energy to the fuel supplied to the reforming reaction section 26 so as to increase the thermal efficiency of the thermal energy generated from the heat source section 24.

The heat delivery unit 30 comes in contact with the outer circumferential surface of the tubular reactor body 21 and delivers the thermal energy generated from the heat source section 24 to the fuel mixture supplied to the reforming reaction section 26. By preheating the fuel, the thermal efficiency is improved.

The heat delivery unit 30 comprises a tubular pass member 31 of which one end is connected to the first and second tanks 51 and 53 and the other end is connected to the flow inlet 22 of the tubular reactor body 21, and a second switch valve 99 provided in the one end of the tubular pass member 31. The second switch valve 99 may selectively open and close the tubular pass member 31.

The pass member 31 is wound around the outer circumferential surface of the tubular reactor body 21 in a coil shape. In the present embodiment, the pass member 31 is constructed such that the number of windings around the outer circumferential surface of the tubular reactor body corresponding to the heat source section 24 is greater than the number of windings around the outer circumferential surface of the tubular reactor body 21 corresponding to the reforming reaction section 26. In other words, the pass member 31 is constructed such that the pitch of the windings around the outer circumferential surface of the tubular reactor body 21 corresponding to the heat source section 24 is narrow and the pitch of the windings around the outer circumferential surface of the tubular reactor body 21 corresponding to the reforming reaction section 26 is wide.

Since the oxidation reaction of the heat source section 24 is an exothermic reaction and the reforming reaction of the reforming reaction section 26 is an endothermic reaction, the number of winding of the pass member 31 is changed on the entire outer circumferential surface of the tubular reactor body 21 in order to enhance the thermal conductivity to the fuel mixture in the heat source section 24 and reduce the thermal conductivity to the fuel mixture in the reforming reaction section 26. That is, by reducing the thermal conductivity of the thermal energy delivered to the reforming reaction section 26 from the heat source section 24 to the fuel mixture and enhancing the thermal conductivity of the thermal energy generated from the heat source section 24 to the fuel mixture, the predetermined temperature range required for the respective parts of the entire reformer 20 can be kept constant.

Figure 5:
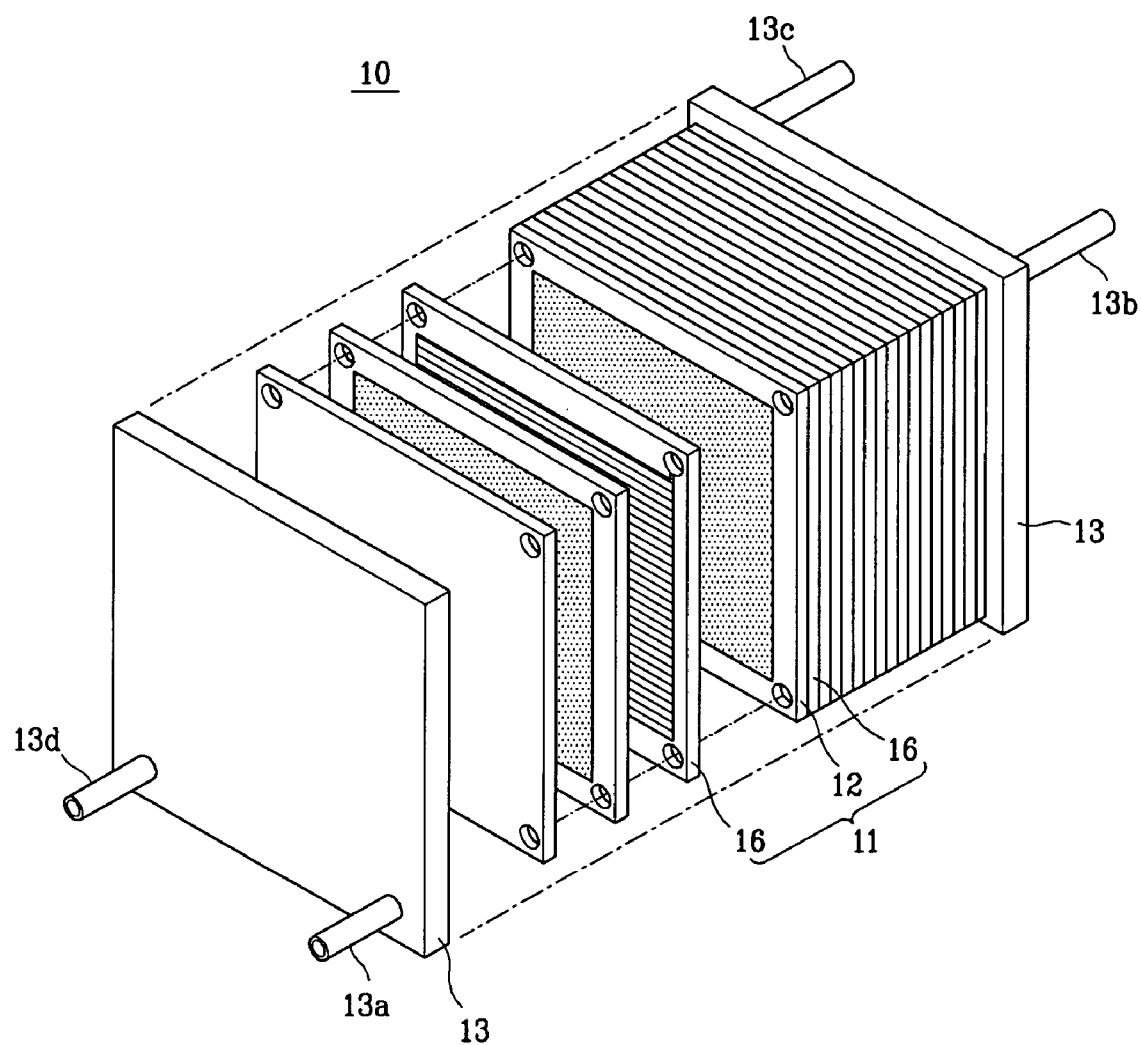
FIG. 5 is an exploded perspective view illustrating the structure of the stack shown in FIG. 1.

FIG. 5 is an exploded perspective view illustrating a structure of the stack shown in FIG. 1.

Referring to FIGS. 1 and 5, the stack 10 according to this embodiment of the present invention allows hydrogen supplied from the reformer 20 and oxygen in air supplied from the air pump 71 to electrochemically react with each other and thus generates electric energy with a predetermined capacity.

The stack 10 includes an electricity generator 11 as the minimum unit generating electric energy, in which separators 16 (also referred to as "bipolar plates" in the art) are disposed in close contact with both surfaces of a membrane-electrode assembly (MEA) 12. Therefore, in the present invention, by sequentially stacking a plurality of electricity generators 11, a stack 10 having a set of electricity generators 11 can be formed.

The MEA 12 disposed between the separators 16 has a structure with an anode electrode formed on one surface, a cathode electrode (not shown) formed on the other surface, and an electrolyte membrane (not shown) interposed between both electrodes. The anode electrode divides hydrogen into electrons and hydrogen ions, the electrolyte membrane moves the hydrogen ions to the cathode electrode, and the cathode electrode allows the electrons and hydrogen ions supplied from the anode electrode to react with oxygen in air and thus generate water.

The separators 16 come in close contact with both surfaces of the MEA 12, and serve to supply the anode electrode of the MEA 12 with hydrogen supplied from the reformer 20 and to supply the cathode electrode of the MEA with air supplied from the air pump 71. The separators 16 also function as a conductor for connecting the anode electrode and the cathode electrode of the MEA 12 in series to each other.

Additional pressing plates 13 for bringing a plurality of electricity generators 11 in close contact with each other may be provided at the outermost of the stack 10 having the set structure of electricity generators 11.

A first inlet 13a for supplying hydrogen to the electricity generators 11, a second inlet 13b for supplying air to the electricity generators 11, a first outlet 13c for discharging the remaining hydrogen not participating in the reaction of the electricity generators 11, and a second outlet for discharging the remaining air not participating in the reaction of the electricity generators 11 along with moisture generated through a bonding reaction of hydrogen and oxygen are formed in the pressing plates 13. Here, the first inlet 13a and the flow outlet 23 of the tubular reactor body 21 are connected through a third supply line 83 and the second inlet 13b and the air pump 71 are connected through a fourth supply line 84.

Operation of the fuel cell system according to an embodiment of the present invention having the above-mentioned structure will be now described in detail.

First, when the fuel cell system 100 is started, the fuel pump 55 supplies the fuel stored in the first tank 51 to the inner space of the tubular reactor body 21 through the first supply line 81. At this time, the flow through the first supply line 81 is kept open by operation of the first switch valve 97. The tubular pass member 31 is kept in its closed state with operation of the second switch valve 99.

At the same time, the air pump 71 supplies the air to the inner space of the tubular reactor body 21 through the second supply line 82. The fuel passing through the first supply line 81 and the air passing through the second supply line 82 are mixed in the merged line 91 and the mixture of fuel and air is supplied to the inner space of the tubular reactor body 21.

The fuel is oxidized in the air as it passes through the oxidation catalyst layer 25 of the heat source section 24 in the tubular reactor body 21. Due to the oxidation reaction, the heat source section 24 generates thermal energy having a predetermined temperature range. Then, the generated thermal energy is delivered to the tubular reactor body 21, and thus the tubular reactor body 21 keeps a predetermined temperature with the thermal energy. A reaction gas having a relatively high temperature which is generated from the heat source section 24 passes through the pores 29 of the barrier 28 and is delivered to the reforming reaction section 26. Therefore, the reforming catalyst layer 27 of the reforming reaction section 26 is preheated at a predetermined temperature with the thermal energy of the reaction gas.

Thereafter, the normal operation of the reformer 20 according to the present embodiment is carried out. That is, in this state, by activating the fuel pump 55, the fuel stored in the first tank 51 and the water stored in the second tank 53 are supplied to the inner space of the tubular reactor body 21 through the pass member 31.

At this time, the first supply line 81 is kept in its closed state with operation of the first switch valve 97 such that the fuel is no longer supplied to the heat source section 24 through the first supply line 81. However, the air continues to be supplied to the heat source section 24 through the second supply line with the continuous activation of the air pump 71. The pass member 31 is kept in its opened state with operation of the second switch valve 99.

That is, in this state, since the pass member 31 is in contact with the outer circumferential surface of the tubular reactor body 21 and is heated at a predetermined temperature in a coil shape, the fuel mixture of fuel and water passing through the pass member 31 is supplied with the heat generated from the heat source 24 and is preheated to a predetermined temperature. The preheated fuel mixture is supplied to the inner space of the tubular reactor body 21 through the flow inlet 22 of the tubular reactor body 21.

Since the pass member 31 has more windings around the outer circumferential surface of the tubular reactor body 21 corresponding to the heat source section 26 than around the outer circumferential surface of the tubular reactor body 21 corresponding to the reforming reaction section 24, the thermal conductivity to the fuel mixture at the heat source 24 side is great, and the thermal conductivity to the fuel mixture at the reforming reaction section 26 is small. Therefore, the reformer 20 can keep constant the predetermined temperature range required for the respective parts thanks to the above-mentioned winding structure of the pass member 31.

Therefore, a part of the fuel mixture and the air supplied to the inner space of the tubular reactor body 21 are subjected to a partial oxidation reaction with the oxidation catalyst layer 25 during passing through the oxidation catalyst layer 25 of the heat source section 24. Accordingly, the heat source section 24 generates a small amount of hydrogen and thermal energy through the partial oxidation reaction of the fuel mixture and the air and delivers the thermal energy to the reforming catalyst layer 27 of the reforming reaction section 26.

The remaining fuel mixture is supplied to the reforming reaction section 26 through the pores 29 of the barrier 28. Then, in the reforming reaction section 26, the fuel mixture absorbs the thermal energy delivered from the heat source section 24 during passing through the reforming catalyst layer 27 and causes the steam reforming reaction with the reforming catalyst layer 27. Therefore, the reforming reaction section 26 generates hydrogen from the fuel mixture through the steam reforming reaction and supplies the generated hydrogen to the first inlet 13a of the stack 10 through the third supply line 83. At the same time, the air pump 71 supplies the air to the second inlet 13b of the stack 10 through the fourth supply line 84.

As a result, the stack 10 generates a predetermined capacity of electric energy through the electrochemical reaction of hydrogen and oxygen in the electricity generators 11.

Thereafter, when the fuel mixture and the air are continuously supplied to the inner space of the tubular reactor body 21, it is possible to generate hydrogen from the fuel mixture through the steam reforming reaction of the fuel mixture in the reforming catalyst layer 27 of the reforming reaction section 26 while generating the thermal energy through the partial oxidation reaction of the fuel mixture and the air in the oxidation catalyst layer 25 of the heat source section 24 without supplying the fuel and the air to the heat source section 24 to generate the thermal energy as at the time of starting.

According to the present invention described above, since there is provided a reformer having a simple structure which can directly and rapidly deliver the thermal energy generated from the heat source section to the reforming reaction section, it is possible to reduce the starting time for the reformer and to reduce the heat delivery path from the heat source section to the reforming reaction section. Therefore, it is possible to maximize the thermal efficiency and performance of the entire fuel cell system and also to embody the entire fuel cell system in a compact size.

According to the present invention, the fuel supplied to the reforming reaction section can be preheated using the thermal energy generated from the heat source section. Accordingly, since the reformer can be activated without external heating by means of the partial oxidation and the reforming reaction of the fuel mixture and the air, it is possible to improve the performance and thermal efficiency of the reformer.

Although exemplary embodiments of the present invention have been described, the present invention is not limited to the embodiments, but may be modified in various forms without departing from the scope of the appended claims, the detailed description, and the accompanying drawings of the present invention. Therefore, it is natural that such modifications belong to the scope of the present invention.

What is claimed is:

1. A reformer for producing hydrogen from a hydrogen-containing fuel for a fuel cell system comprising:
    a tubular reactor body defining an inner space;
    a heat source section located in a first portion of the inner space of the tubular reactor body containing an oxidation catalyst adapted to generate thermal energy by the oxidation of a first portion of the hydrogen-containing fuel;
    a reforming reaction section located successive to the heat source section in a second portion of the inner space of the tubular reactor body, the reforming reaction section containing a reforming catalyst adapted to generate hydrogen from a second portion of the hydrogen-containing fuel; and
    a heat delivery unit comprising a tubular pass member coiled around and in physical contact with an exterior surface of the heat source section and an exterior surface of the reforming reaction section of the tubular reactor body and adapted to transfer a portion of the thermal energy from the heat source section through the exterior surface of the heat source section to at least some of the second portion of the hydrogen-containing fuel, wherein the pass member is coiled such that a density of windings around the portion of the tubular reactor body corresponding to the heat source section is greater than a density of windings around the portion of the tubular reactor body corresponding to the reforming reaction section.

2. The reformer of claim 1 further comprising a flow inlet at one end of the tubular reactor body and a flow outlet at the other end.

3. The reformer of claim 2, further comprising a barrier disposed in the inner space of the tubular reactor body between the heat source section and the reforming reaction section.

4. The reformer of claim 3, wherein the heat source section is formed in the inner space between the barrier and the flow inlet and the reforming reaction section is formed in the inner space between the barrier and the flow outlet.

5. The reformer of claim 3, wherein the oxidation catalyst comprises a pellet-shaped layer of oxidation catalyst between the barrier and the flow inlet, and the reforming catalyst comprises a pellet-shaped layer of reforming catalyst between the barrier and the flow outlet.

6. The reformer of claim 3, wherein the barrier comprises a mesh material.

7. The reformer of claim 3, wherein the barrier comprises a perforated disk.

8. The reformer of claim 2, wherein the tubular pass member is connected to the flow inlet, and a switch valve is in the tubular pass member.

9. The reformer of claim 1, wherein the tubular reactor body comprises a thermally conductive metal.

10. The reformer of claim 9, wherein the thermally conductive metal is selected from the group consisting of stainless steel, aluminum, copper, iron, and combinations thereof.

* * * * *